Feb. 10, 1942.  N. HAWRYLASZ  2,272,801
BICYCLE
Filed Feb. 24, 1940
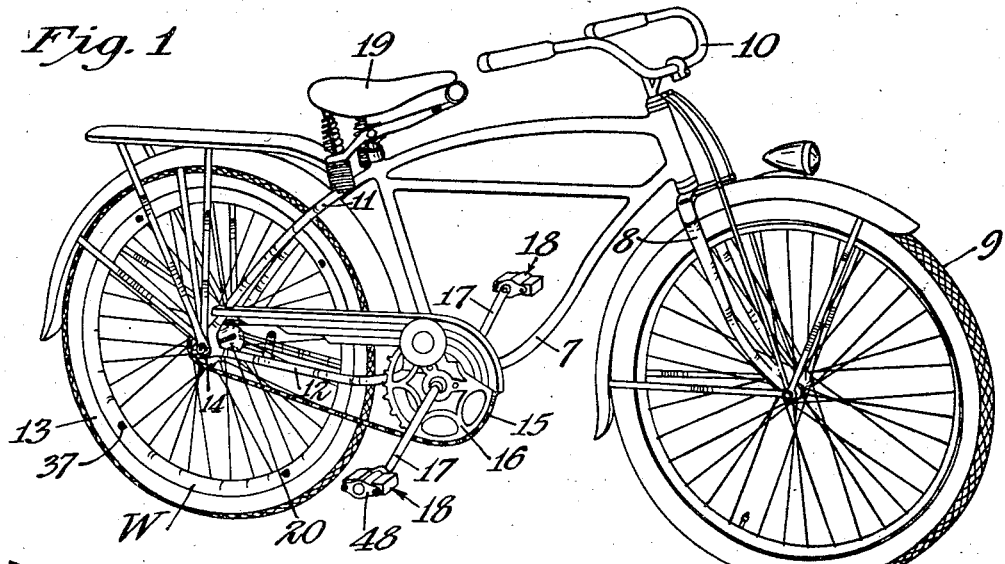
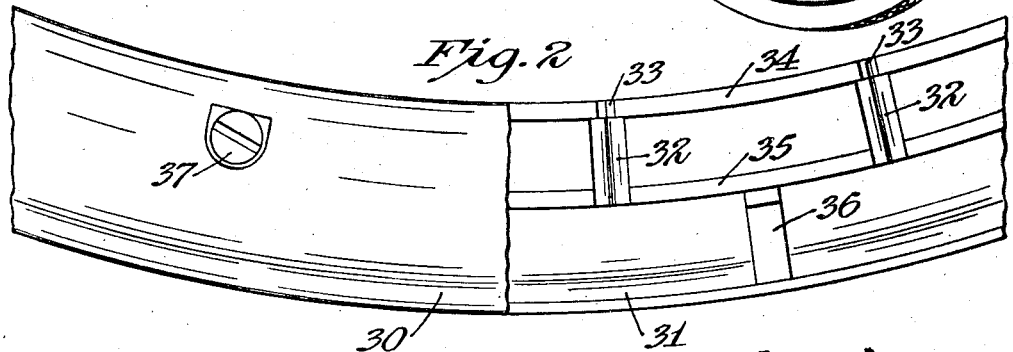
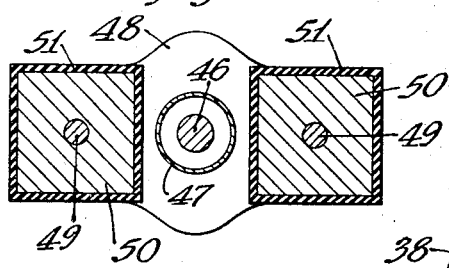
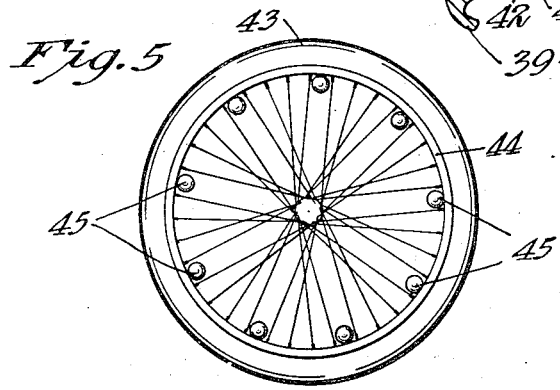
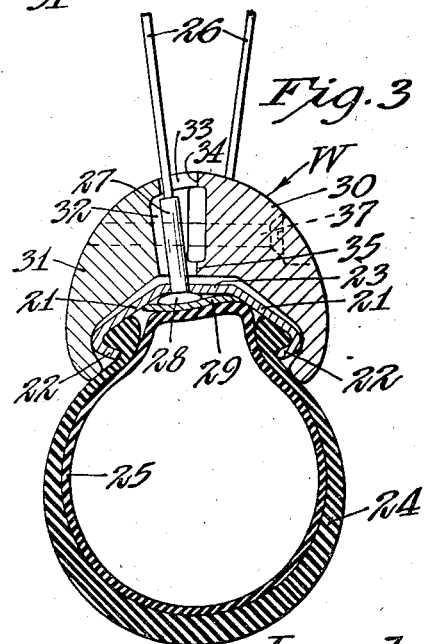
Inventor
Nykyfor Hawrylasz
By Williamson + Williamson
Attorneys Patented Feb. 10, 1942

2,272,801

UNITED STATES PATENT OFFICE 2,272,801

BICYCLE

Nykyfor Hawrylasz, Minneapolis, Minn., assignor of one-half to Henry A. Dankelmann, St. Paul, Minn.

Application February 24, 1940, Serial No. 320,682

4 Claims. (Cl. 280—212)

This invention relates to improvements in rider propelled vehicles and more particularly to bicycles.

Ordinarily when pedaling a bicycle due to its relatively light construction it is comparatively easy to travel over level ground, but when the rider starts up an incline the bicycle quickly loses its momentum and travel up the incline is difficult. Furthermore, when coasting down grade the vehicle soon loses its momentum after it has reached level ground or starts up grade again, and the result is that it is necessary for the rider to exert pedaling effort for a considerable part of the time he is riding.

It is an object of my invention to provide means in combination with a bicycle or similar wheeled vehicle which will permit the building up of additional momentum so that once speeds are attained it will travel forwardly for considerably longer distances and thus save the rider a great amount of pedaling effort.

A more specific object of the invention is to provide a heavily weighted wheel rim and in combination therewith a heavily weighted pedal and sprocket unit which when caused to rotate will build up rotational momentum to prolong the forward movement of the bicycle without pedaling or without the exertion of extra pedaling effort. In this respect the weighted pedal and sprocket unit can be rotated in building up speeds with little effort due to the leverage of the pedal cranks, and the rotational momentum of the pedal unit is caused to transmit considerable work with little effort to the heavily weighted driving wheel of the bicycle. This combination of built up forces is much more efficient and requires much less effort than would be needed if the total added weight were applied to the driving wheel only. In the latter case considerable work would be required since the driving wheel is normally rotated by a chain drive from the pedal unit to a small sprocket at the hub of the driving wheel, and the radius of this small sprocket is considerably less than the radius from the hub to the weighted wheel rim.

Still another object of the invention is to provide in combination with a bicycle having a coaster brake a heavily weighted wheel and a heavily weighted rotating pedal unit wherein the pedal unit is partially rotated reversely to its normal relation for the application of the brake and wherein the rotational momentum of the pedal unit in a reverse direction will assist the rider in overcoming the additional rotational momentum of the heavily weighted wheel.

A further object of the invention is to provide an attachment for bicycle wheels which can be easily applied to a conventional wheel and rim structure.

Another object of the invention is to provide a special rim structure which is inherently heavily weighted to provide a structure having the effect of a fly wheel.

Still another object of the invention is to provide a pedal structure which incorporates heavily weighted units and which at the same time has the appearance of a conventional bicycle pedal.

These and other objects and advantages of the invention will more fully appear from the following description made in connection with the accompanying drawing, wherein like reference characters refer to the same parts throughout the views, and, in which;

Fig. 1 is a perspective view of a bicycle constructed in accordance with my invention;

Fig. 2 is an enlarged fragmentary detail partially broken away showing one form of structure for adding weight to the wheel rim;

Fig. 3 is a cross sectional view through a rim and tire and through a rim weighting element such as the one shown in Fig. 2;

Fig. 4 is a cross sectional view of an integrally weighted rim structure;

Fig. 5 is a side elevation of a wheel with a different form of weighting means illustrated; and Fig. 6 is a cross sectional view through a weighted foot pedal structure.

Fig. 1 illustrates a conventional bicycle structure which includes a frame 7, front forks 8 mounted upon the hub of a front wheel generally indicated at 9, said forks being pivotally mounted with respect to the frame and adapted to be steered by handle bars 10. Rear fork members 11 and 12 converge at their rear ends and are connected to the hub of a rear wheel generally indicated at 13. The rear wheel hub carries a small sprocket 14 which is connected by a drive chain 15 to a large pedal sprocket 16. Mounted for rotation with the large sprocket 16 are oppositely extending crank arms 17 carrying pedals generally indicated at 18. A seat for the rider is, of course, provided as at 19. A conventional type of coaster brake is generally indicated at 20. The details of this brake are not shown but coaster brakes are so well known in the art and so commonly known by riders of bicycles that it is unnecessary to go into its structure. The only thing that need be said is that it permits free wheeling of the bicycle or coasting with the pedal unit stationary, and the brake can be applied by partially rotating the pedal unit in a reverse direction. In Fig. 3 there is shown a type of rim and tire structure which is in rather general use. The rim 21 is provided with a pair of inwardly turned tire bead retainers 22 and what is known commonly as a drop center portion 23. The casing 24 is shown with beads lying beneath the flanges 22 on the rim, and within the casing is a tube 25 which is adapted to hold air under pressure. Wheel spokes 26 extend from the rim alternately to opposite sides of the wheel hub as is commonly understood and the outer ends of said spokes carry nipples 27 which are threaded on the spokes and which are retained in the rim by means of the heads 28. It is preferred that a tire flap 29 be placed in the rim to protect the tube from the nipple heads 28.

Mounted around the inside of the rim is a flywheel weight W. It is composed of a pair of circular complementary sections 30 and 31. It will be seen that when the two sections are placed together within and around the rim 21 they have complementary portions which are shaped to relatively closely fit the convex contour of said rim. Where the two weight sections come together they are provided with cut out notches 32 which are reduced at their upper ends at 33. The larger notch portions 32 are adapted to receive the spoke nipples 27 and the smaller notched portions 33 fit around the spokes 26. The contacting faces of the weight sections are provided with beads 34 and 35 to provide contact weights between said weight sections. The lower portions of the weight sections are provided at spaced points with lugs 36 whose outer faces are adapted to rest against the wheel rim 21 so that the weight sections will fit rigidly without shifting or rattling. At spaced points around the sections I provide bolts 37 and, as shown in Fig. 3, the bolts extend through the section 30 and are threaded into the weight section 31. The bolt heads are countersunk as shown so that the assembled and mounted weight unit presents a smooth appearance and does not noticeably alter the conventional appearance of the wheel.

The structure shown in Fig. 4 is a combined weight and tire rim 38 and it will be seen that it is provided with tire bead engaging flanges 39 and a drop center portion 40. It is formed from a solid piece of metal and spoke nipple holes 41 with countersunk nipple head weights 42. The nipple holes 41 are shown of generally uniform diameter and it is contemplated than an elongated nipple can be used so that the end of the nipple will project out of the weighted rim so that it can be reached with a spoke wrench for tightening and otherwise adjusting the tension of the individual spokes.

In Fig. 5 there is shown a wheel having a tire 43 and rim 44. This rim is of conventional structure but has mounted thereon at spaced points a plurality of weights 45 which may be welded or otherwise secured to said rim 44. These weights will function in the same manner as the structure shown in Figs. 3 and 4 to give added rotational momentum to the wheel when the bicycle has attained a reasonable speed. These weights are shown spherical in shape, but, of course, they may be made in any shape whatsoever as long as they can be conveniently mounted on the rim 44.

In Fig. 6 there is shown a sectional view of a foot pedal. It includes the usual pedal shaft 46 which extends outwardly at right-angles from the pedal crank indicated at 17 in Fig. 1 and around the pedal shaft 46 is the usual pedal shaft cover sleeve 47. The sleeve 47 is connected to end plates 48. Between the end plates 48 are mounted bolts 49 which in the normal pedal construction carry rubber pedal pads. In this case, however, the bolts 49 carry heavy metal elements 50 which are preferably of lead or some other dense material. Over the weighted pedal elements 50 can be rubber covers 51 to prevent the foot of the rider from slipping from the pedal.

It is the combination of the above described pedal unit with the weighted driving wheel unit which provides means for building up considerable rotational momentum to maintain rotation of the wheel and forward movement of the bicycle for considerable distances after the rider has ceased to apply pedalling force to the pedal unit. Should all of the weight which is combined in the pedals and in the rim be concentrated entirely in the wheel rim, it would require an appreciable additional effort on the part of the rider to pick up speed since the chain 15 between the sprockets 14 and 16 would require the application of considerable effort to cause the small sprocket 14 to rotate the drive wheel with its heavily weighted rim. This is obviously due to the fact that the sprocket 14 which rotates with the drive wheel has a great deal less radius than the weighted rim portion W. I have, therefore, transferred a considerable amount of the weight required to produce appreciable rotational momentum to the rotating pedal unit. This reduces the effort required for building up speeds since the pedaling force is applied directly to that portion of the added weight which is incorporated in the pedals and not indirectly as through the small sprocket 14 to the rear wheel. Since a large percentage of the added weight required by my invention is added to the pedal unit obviously that much weight is removed from the wheel weight W. Furthermore, the rotational momentum built up in the rotating pedal unit is transmitted to the rear wheel to materially assist the rider in gaining speed against the increased inertia of the weighted rear wheel. While the rider is actually overcoming a greater degree of inertia in building up speeds with the bicycle it has been found that hardly any appreciable extra effort is required in view of the cooperative relation between the weighted rotary pedal unit and the weighted drive wheel rim structure. However, after speed is built up and the rider stops pedalling there is considerable rotational momentum in the weighted drive wheel and it is possible for the rider to coast for much greater distances than it has heretofore been possible. When the rider approaches an up grade the rotational momentum built up in the heavy drive wheel and that provided in the weighted pedal unit will permit the rider to travel over rises of average height and inclination without exerting any more effort than when traveling over comparatively level ground. It is, of course, not claimed that my invention will be of assistance in connection with the climbing of unusually long and/or steep grades.

When the rider desires to retard his speed or to stop it requires no great effort to stop the forward rotational movement of the pedal unit due to the direct application of force against the weighted pedals and when the direction of the pedals is reversed the rotational momentum of the pedal unit assists the rider in overcoming the rotational momentum which has been built up in the driving wheel. For that reason it is not necessary to apply any undue force in braking the vehicle.

From the foregoing description it will be seen that I have provided a vehicle structure which will operate to greatly increase the coasting periods due to rotational momentum built up in the weighted driving wheel and wherein the building up of such momentum is assisted by the weighted pedal unit. It also assists considerably in climbing average sized inclinations. The invention can be incorporated with cycles of conventional structure with the expenditure of very little time and labor, or if desired it can be built into the wheel at the factory. There is nothing in the structure which detracts from the conventional appearance of the vehicle since it blends in with standard construction to such a degree that it is practically unnoticeable.

It will, of course, be understood that various changes may be made in the form, arrangements, details and proportions of the various parts without departing from the scope of my invention.

What is claimed is:

1. In a rider propelled wheeled vehicle, a frame, wheels including a drive wheel supporting said frame, a rotary rider operated drive device connected to said drive wheel, said drive device being positioned on said frame for direct rider contact, a relatively heavily weighted rim on said drive wheel to maintain momentum of said vehicle after speed is built up, and said rotary drive device being weighted to constitute a flywheel member, whereby force applied directly to said drive device by the rider will build up momentum and supplement force transmitted from the rider through said drive device to said heavily weighted drive wheel.

2. In a rider propelled wheeled vehicle, a frame, a pair of wheels supporting said frame, one of said wheels constituting a drive wheel and being considerably heavier weighted than the other of said pair of wheels, a rotary pedal unit directly operable by the rider, said pedal unit being weighted to produce a flywheel effect when rotated by direct rider contact, and a drive connection between said pedal unit and said weighted drive wheel, whereby rotational momentum in said pedal unit supplementing the applied force of the rider is transmitted to said heavily weighted drive wheel to assist in building up rotational momentum in said drive wheel and also to assist in maintaining momentum in said drive wheel.

3. In a rider propelled wheeled vehicle, a frame, wheels including a drive wheel supporting said frame, said drive wheel being relatively heavily and uniformly weighted, a rotary pedal unit, said pedal unit being weighted to provide a flywheel effect when rotated and being operable directly by the rider, and a drive connection from said rotary pedal unit to said weighted drive wheel imparting a relatively higher speed to said drive wheel, whereby direct application of power to said pedal unit by the rider builds up momentum in said pedal unit and whereby said pedal unit momentum is transmitted through said drive connection to said weighted drive wheel to assist the rider in overcoming drive wheel inertia and building up momentum therein.

4. In a rider propelled wheeled vehicle, a frame, wheels including a relatively heavily weighted drive wheel supporting said frame, a weighted pedal unit, a connection between said pedal unit and said weighted wheel to transmit rotational momentum from said pedal unit to said weighted drive wheel to increase the rotational momentum of said weighted drive wheel, said pedal unit and said momentum transmitting connection being reversible to exert rotational momentum in opposition to the momentum of said weighted drive wheel, and braking means for said weighted drive wheel connected to said wheel and to said weighted pedal unit, whereby a reversal of rotational momentum in said pedal unit will produce an auxiliary braking force through said momentum transmitting connection to said brake.

NYKYFOR HAWRYLASZ.